UNITED STATES PATENT OFFICE.

PETER COOPER, OF NEW YORK, N. Y.

IMPROVEMENT IN THE PREPARATION OF PORTABLE GELATINE.

Specification forming part of Letters Patent No. 4,084, dated June 20, 1845.

*To all whom it may concern:*

Be it known that I, PETER COOPER, of the city, county, and State of New York, have invented a new and useful improvement, which consists in making a transparent concentrated or solidified jelly containing all the ingredients fitting it for table use, in a portable form, and requiring only the addition of a prescribed quantity of hot water to dissolve it, when it may be poured into glasses or molds, and when cold will be fit for use, of which the following is a specification.

This improvement is effected by using Cooper's refined American isinglass, (which your petitioner would recommend both on account of its superior quality and far greater cheapness,) the Russian isinglass, or any other pure form of gelatine, which may be taken either in the solid and dry form, in which it is usually found for sale, (in which case it must again be reduced to a liquid state by the application of water and heat,) or it may be taken directly from the manufactory in its liquid state, thus saving all the expense and risk of its subsequent preparation, as well as the necessity of again reducing it to a fluid form. To this liquid gelatine I would then add the following ingredients: For every hundred pounds of isinglass or gelatine, four hundred pounds best white sugar, the juice or acid of twelve hundred lemons, or an equivalent of acid of limes, the peal or rind of three hundred lemons, eight hundred eggs, or a sufficient quantity of other finings, one pound peach-pits, one pound cinnamon, one pound mace, one pound allspice, half-pound of cloves, with such other spices and such variations of the quantities of all as will suit the tastes of different persons. To this solution of gelatine, with the various ingredients incorporated with it, a sufficient quantity of water should be added to reduce the whole mass to a fluid of such consistency as would admit (after being boiled about ten minutes) of being passed through a fine filter. This filter may be constructed in any of the various forms now used in the refining of sugar. After this hot fluid has been passed through the filter, and thus rendered perfectly transparent, it is then to be concentrated or condensed by the evaporation of the great part of the water to such consistency as will insure it to keep for any length of time in a state of perfect preservation; or, if preferred, the water may be entirely evaporated and the whole reduced to a solid form. This may be effected by any of the following methods: by boiling *in vacuo* by any of the ordinary methods used in the refining of sugar; by forcing heated air into, through, or on the surface of the fluid; by evaporating in open pans heated by steam or otherwise, or by solar evaporation. In all these methods, however, care must be taken that the fluid be not brought up to 212° Fahrenheit, as violent and long-continued heat injures the strength of the gelatine. This transparent jelly, having been reduced by either of the above methods to a proper consistence, may, while yet hot, be drawn into jars or molds of any convenient form, and will be ready for sale. To this concentrated or solidified jelly it is only necessary to add a sufficient quantity of hot water to produce at any time a jelly of any consistency that may be required.

The improvement which I claim as my invention, and desire to secure by Letters Patent, consists in making a transparent concentrated or solidified jelly containing all the ingredients, so combined, concentrated, or solidified that the article may be kept in a perfect state of preservation for any length of time, and be in a portable form for the supply of shipping, families, or for exportation, and requiring only the addition of the prescribed quantity of hot water to dissolve it, when it may be poured into glasses or molds, and when cold will be fit for use.

PETER COOPER.

Witnesses:
M. D. FRENCH,
ABRAM S. HEWITT.